July 28, 1942.     D. A. WALLACE     2,291,124
VEHICLE VENTILATING AND HEATING SYSTEM
Filed May 23, 1940     2 Sheets-Sheet 1
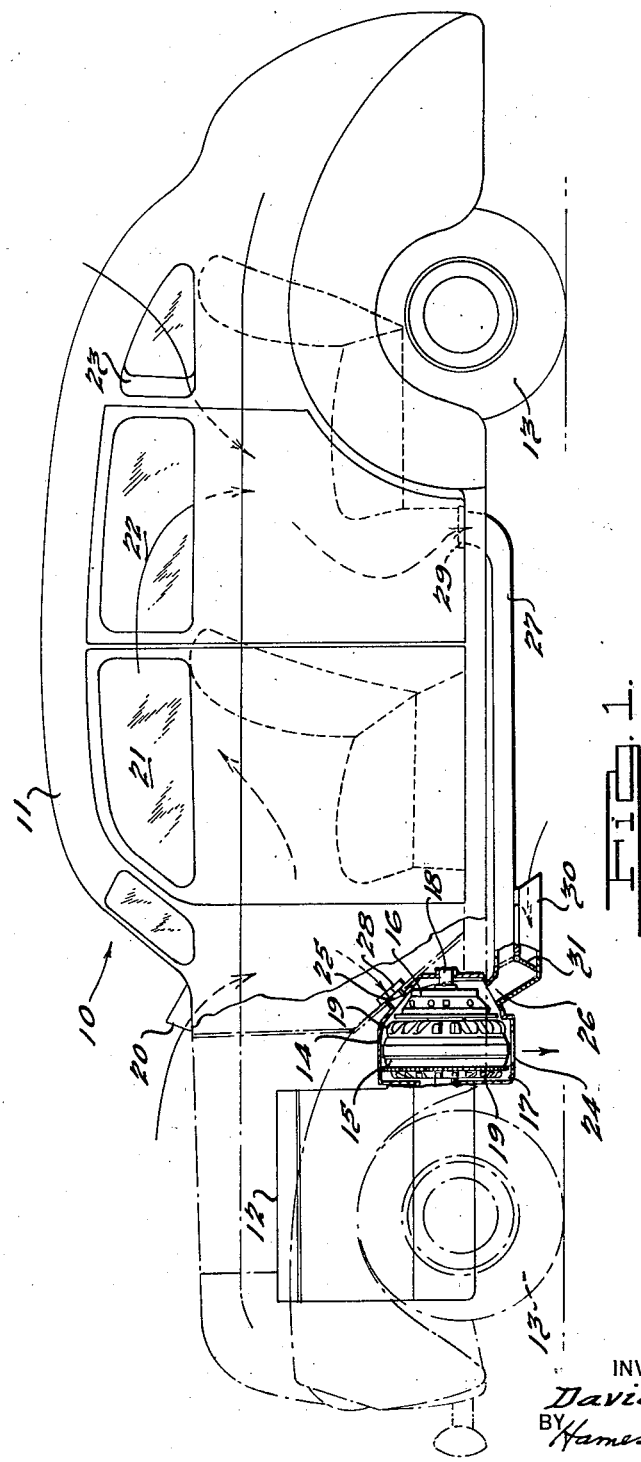
INVENTOR
David A. Wallace.
BY Hamess, Lind, Patter Hoine
ATTORNEYS.

July 28, 1942. D. A. WALLACE 2,291,124
VEHICLE VENTILATING AND HEATING SYSTEM
Filed May 23, 1940 2 Sheets-Sheet 2
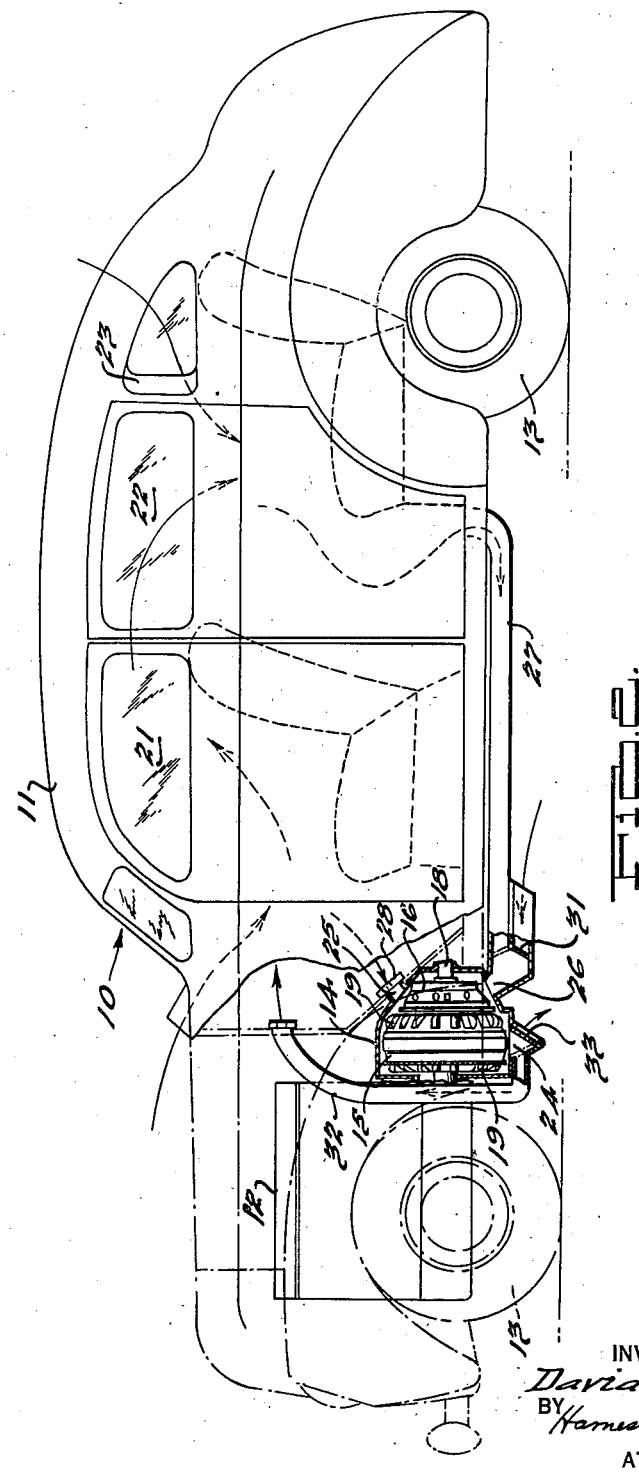
INVENTOR
David A. Wallace.
BY
ATTORNEYS.

Patented July 28, 1942

2,291,124

UNITED STATES PATENT OFFICE 2,291,124

VEHICLE VENTILATING AND HEATING SYSTEM

David A. Wallace, Detroit, Mich., assignor to Chrysler Corporation, Highland Park, Mich., a corporation of Delaware Application May 23, 1940, Serial No. 336,729

2 Claims. (Cl. 180—54)

The present invention relates to motor vehicle ventilating and heating systems generally and particularly to ventilating and heating systems for vehicles having fluid drive transmissions.

It is common in the vehicle art to provide vehicles employing fluid couplings, torque converters and the like, with means for circulating air around the coupling or torque converter unit for carrying away the heat generated as an incident to the operation thereof. This air is usually circulated by a series of fan blades provided on the casing of the coupling or converter and is usually taken into the transmission housing through suitable openings and discharged through other openings after it has circulated around the power transmitting unit.

It is the principal object of the invention to provide a ventilating system for vehicles wherein the cooling air supplied to the fluid transmission unit is taken from the passenger compartment of the vehicle, which is provided with suitable openings for admitting air from outside the body, thereby causing the air in the passenger compartment to be changed continually during operation of the vehicle engine without the creation of drafts.

A further object is to provide in connection with a ventilating system of the aforesaid type, means for heating the air in the body passenger compartment by circulating it through the transmission housing and around the fluid drive unit.

Other objects and advantages of the invention will readily become apparent from the following description taken in conjunction with the accompanying drawings which illustrate preferred embodiments thereof.

In the drawings in which reference numerals are used to designate corresponding parts in the following description:

Fig. 1 is a phantom view in side elevation of a vehicle having a fluid coupling drive illustrating the principles of the ventilating system.

Fig. 2 is a similar view illustrating the principles of a combined ventilating and heating system.

Referring to Fig. 1, 10 designates a vehicle having a body 11, an engine 12 and drive wheels 13. The engine 12 is coupled to the rear road wheels through a power transmission unit 14 which consists of a fluid coupling 15 and a releasable friction clutch 16, the unit being enclosed in a housing 17. The drive is transmitted to the rear wheels 13 by a propeller shaft 18. The fluid coupling is of the same type as that described in the co-pending application of Gordon R. Pennington, Serial No. 334,755, filed in the United States Patent Office on May 13, 1940, and is provided with fan blades 19 for circulating cooling air through housing 17.

The body 11 is provided with suitable ventilating openings such as those indicated at 20, 21, 22 and 23, which may be opened and closed by the driver or passengers to regulate the amount of air taken into the passenger compartment.

The housing 14 is provided with one or more exhaust openings 24 and a pair of suction openings 25 and 26. The opening 25 is connected with the front of the body passenger compartment as illustrated in Fig. 1 and the opening 26 is connected with the rear of the compartment by means of a conduit. Suitable damper attachments are preferably provided at 28 and 29 to permit regulation of the air flow from the body to the housing 14. When the suction openings 25 and 26 are partially or fully closed off by closure of the dampers 28 and 29, air may be admitted to the housing 14 for cooling the coupling through a conduit 30 which is provided with a flapper type damper 31. The damper 31 is preferably provided with a control mechanism (not shown) for closing off the conduit 30 when air is being taken from the body compartment and for opening it when the dampers 28 and 29 are closed.

It will of course be appreciated that the dampers 28, 29 and 31, as well as the air intake openings 20, 21, 22 and 23, may be adjusted to provide a rate of change of air in the body compartment that is comfortable to the passengers under various weather conditions in accordance with the desires of individual passengers. The arrows on the drawing indicate in a general way the circulation of air when the cowl ventilator 20 and the rear window are open with the fluid coupling fan exhausting air from the body through openings 25 and 26. It may be seen that a rapid and continuous change of air in the body compartment may be accomplished without drafts, even during the time that the vehicle is standing still provided that the engine is running to cause rotation of the fluid coupling 15.

Fig. 2 illustrates a modified form of the invention wherein the fluid coupling is used for heating the vehicle body as well as for ventilating. A conduit 32 is provided for connecting the exhaust opening 24 of housing 14 with the passenger compartment of the vehicle, a suitable damper valve 33 controllable by the driver being provided for directing the exhaust air from housing 14 either into the conduit 32 or to the outside atmosphere as desired. As illustrated in Fig. 2, the damper 33 may be swung about its pivotal mounting to a position closing off communication between the housing 14 and the interior of the body while at the same time opening the housing 14 to the outside air, or it may be swung to the opposite position to direct the fan exhaust into the body, or it may be swung to an intermediate position to thereby permit the fan to exhaust partially into the body and partially to the atmosphere.

By proper adjustment of the dampers and body ventilating controls, any desired proportional volumes of hot and cold air may be drawn into the body and exhausted therefrom. The temperature of the air in the chamber of housing 14 will be around 350° F. while the coupling is in use, so it will be apparent that plenty of heat is available for heating the body even if a substantial volume of cold air is admitted.

It is to be understood that the above described embodiments of the invention are for the purpose of illustration only and that it is contemplated that numerous changes and modifications in the methods of controlling the flow of air, the positions, sizes and design of the parts, etc. could be made without departing from the spirit or scope of the invention as defined in the following claims.

What I claim is:

1. In a motor vehicle having an engine and drive wheels and a body passenger compartment, a fluid coupling connecting said engine and drive wheels for driving the vehicle; a housing enclosing said coupling provided with a plurality of intake openings and an exhaust opening; air impelling blades carried by said coupling operable upon rotation thereof to cause circulation of air through said housing for cooling said coupling; a conduit connecting said passenger compartment with one of said intake openings; a conduit connecting another of said intake openings with the atmosphere; and means associated with both of said conduits for controlling the passage of air therethrough whereby the air supplied to said housing may be partially or totally taken from said passenger compartment.

2. In a motor vehicle having an engine and drive wheels and a body passenger compartment, a fluid coupling connecting said engine and drive wheels for driving the vehicle; a housing enclosing said coupling provided with a plurality of intake openings and an exhaust opening, air impelling blades carried by said coupling operable upon rotation thereof to cause circulation of air through said housing for cooling said coupling, conduits connecting said intake openings with the passenger compartment and atmosphere respectively, a conduit connecting the exhaust opening with the passenger compartment and atmosphere respectively, and means associated with said conduits for controlling the passage of air therethrough whereby the air supplied to said housing may be partially or totally taken from said passenger compartment and the air exhausted from said housing may be partially or totally delivered into said passenger compartment.

DAVID A. WALLACE.